United States Patent
Gusev et al.

(10) Patent No.: US 9,207,987 B2
(45) Date of Patent: Dec. 8, 2015

(54) DISPERSION DEPENDENCY IN ORACLE CLUSTERWARE

(75) Inventors: Andrey Gusev, Dublin, CA (US); Jonathan Creighton, Oakland, CA (US); Raj K. Kammend, Colleyville, TX (US); Sarat B. Kakarla, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 429 days.

(21) Appl. No.: 12/688,769

(22) Filed: Jan. 15, 2010

(65) Prior Publication Data

US 2011/0179172 A1 Jul. 21, 2011

(51) Int. Cl.
G06F 15/16 (2006.01)
G06F 9/50 (2006.01)

(52) U.S. Cl.
CPC ........ G06F 9/5061 (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 6,154,849 A | 11/2000 | Xia | |
| 6,308,163 B1 | 10/2001 | Du et al. | |
| 6,393,485 B1 | 5/2002 | Chao et al. | |
| 6,516,350 B1 * | 2/2003 | Lumelsky et al. | 709/226 |
| 6,594,779 B1 | 7/2003 | Chandra et al. | |
| 6,782,408 B1 | 8/2004 | Chandra et al. | |
| 6,931,640 B2 | 8/2005 | Asano et al. | |
| 6,990,666 B2 | 1/2006 | Hirschfeld et al. | |
| 7,281,045 B2 * | 10/2007 | Aggarwal et al. | 709/226 |
| 7,340,578 B1 | 3/2008 | Khanzode | |
| 7,383,383 B1 | 6/2008 | Bandopadhyay et al. | |
| 7,392,421 B1 | 6/2008 | Bloomstein et al. | |
| 7,451,201 B2 | 11/2008 | Alex et al. | |
| 7,464,147 B1 | 12/2008 | Fakhouri et al. | |
| 7,480,281 B2 | 1/2009 | Hare et al. | |
| 7,484,223 B2 | 1/2009 | Hill et al. | |
| 7,577,099 B1 * | 8/2009 | Greenberg et al. | 370/242 |
| 7,581,224 B2 * | 8/2009 | Romero | 718/104 |
| 7,669,087 B1 * | 2/2010 | Johnsen et al. | 714/6.32 |
| 7,827,302 B2 | 11/2010 | Weinert et al. | |
| 7,904,756 B2 | 3/2011 | Dilman et al. | |
| 8,020,034 B1 | 9/2011 | Shrivastava et al. | |
| 8,103,635 B2 | 1/2012 | Lee et al. | |
| 8,154,554 B1 | 4/2012 | Brown et al. | |
| 8,180,864 B2 | 5/2012 | Ghattu | |
| 8,180,922 B2 * | 5/2012 | Dini et al. | 709/241 |
| 8,364,648 B1 | 1/2013 | Sim-Tang | |

(Continued)

OTHER PUBLICATIONS

Strohm, Richard, "Oracle Clusterware Adminstration and Deployment Guide", 11g Release 1 (11.1), dated Sep. 2007, 180 pages.

(Continued)

*Primary Examiner* — Scott B Christensen
(74) *Attorney, Agent, or Firm* — Hickman Palermo Becker Bingham LLP

(57) ABSTRACT

A method and apparatus for resource dispersion in a clusterware system is provided. The resource profiles for resources within a cluster of nodes are stored. Each resource profile includes attributes for a resource. One or more of the attributes in one of the resource profiles includes a dispersion dependency attribute that specifies that the resource is preferably not co-located with another resource. Resources are placed within the cluster based, at least in part, on the dispersion preference.

22 Claims, 9 Drawing Sheets

(56) References Cited

U.S. PATENT DOCUMENTS

| | | |
|---|---|---|
| 8,364,726 B2 | 1/2013 | Georgiev |
| 8,429,450 B2 | 4/2013 | Brown et al. |
| 8,543,862 B2 | 9/2013 | Dilman et al. |
| 2002/0087665 A1 | 7/2002 | Marshall et al. |
| 2002/0120744 A1 | 8/2002 | Chellis et al. |
| 2002/0124085 A1 | 9/2002 | Matsuda et al. |
| 2002/0198984 A1 | 12/2002 | Goldstein et al. |
| 2002/0198996 A1 | 12/2002 | Sreenivasan et al. |
| 2003/0126240 A1 | 7/2003 | Vosseler |
| 2004/0226025 A1 | 11/2004 | Beaudoin et al. |
| 2005/0177628 A1* | 8/2005 | Victoria et al. ............... 709/220 |
| 2005/0188283 A1 | 8/2005 | Pomaranski et al. |
| 2005/0198275 A1 | 9/2005 | D'Alo et al. |
| 2005/0234931 A1 | 10/2005 | Yip et al. |
| 2006/0047813 A1 | 3/2006 | Aggarwal et al. |
| 2006/0053410 A1 | 3/2006 | Charisius et al. |
| 2006/0163338 A1 | 7/2006 | Allen et al. |
| 2006/0195448 A1 | 8/2006 | Newport |
| 2006/0206860 A1 | 9/2006 | Dardinski |
| 2007/0168965 A1 | 7/2007 | Zenz et al. |
| 2007/0174101 A1 | 7/2007 | Li et al. |
| 2008/0021917 A1 | 1/2008 | Baker et al. |
| 2008/0052719 A1* | 2/2008 | Briscoe et al. ................ 718/104 |
| 2008/0141261 A1* | 6/2008 | Machida ....................... 718/104 |
| 2008/0209397 A1 | 8/2008 | Mohindra et al. |
| 2008/0222642 A1 | 9/2008 | Kakarla et al. |
| 2008/0312982 A1 | 12/2008 | Braun et al. |
| 2008/0313118 A1* | 12/2008 | Anerousis et al. .............. 706/46 |
| 2008/0320460 A1 | 12/2008 | Miller et al. |
| 2009/0006888 A1 | 1/2009 | Bernhard et al. |
| 2009/0037367 A1 | 2/2009 | Wein |
| 2009/0043809 A1 | 2/2009 | Fakhouri et al. |
| 2009/0054140 A1 | 2/2009 | Beser et al. |
| 2009/0094380 A1* | 4/2009 | Qiu et al. ...................... 709/239 |
| 2009/0125751 A1 | 5/2009 | Dawson et al. |
| 2009/0172668 A1 | 7/2009 | Bobak et al. |
| 2009/0222540 A1 | 9/2009 | Mishra et al. |
| 2009/0290483 A1 | 11/2009 | Curtis et al. |
| 2009/0328024 A1 | 12/2009 | Li et al. |
| 2010/0064009 A1 | 3/2010 | Chen et al. |
| 2010/0107172 A1 | 4/2010 | Calinescu et al. |
| 2010/0161290 A1 | 6/2010 | Duchenay et al. |
| 2010/0241896 A1 | 9/2010 | Brown et al. |
| 2010/0257535 A1 | 10/2010 | Badovinatz et al. |
| 2010/0332659 A1 | 12/2010 | Marowsky-Bree et al. |
| 2011/0087784 A1* | 4/2011 | Liu ................................ 709/226 |
| 2011/0119681 A1 | 5/2011 | Spencer et al. |
| 2011/0125895 A1 | 5/2011 | Anderson et al. |
| 2011/0145392 A1 | 6/2011 | Dawson et al. |
| 2011/0179169 A1 | 7/2011 | Gusev et al. |
| 2011/0179170 A1 | 7/2011 | Gusev et al. |
| 2011/0179171 A1 | 7/2011 | Gusev et al. |
| 2012/0226788 A1 | 9/2012 | Jackson |
| 2013/0024728 A1 | 1/2013 | Lee et al. |
| 2014/0149783 A1 | 5/2014 | Georgiev |

OTHER PUBLICATIONS

Strohm, Richard, "Oracle Clusterware Adminstration and Deployment Guide", 11g Release 1 (11.2), dated Aug. 2009, 322 pages.
Microsoft Computer Dictionary, dated 2002, Microsoft Press, 5th edition, 3 pages.

* cited by examiner

Resources With a Dispersion Relation Placed on Separate Nodes

Active Dispersion

Resource Movement Based on Clusterware Event

Dispersion Metrics

DISPERSION DEPENDENCY IN ORACLE CLUSTERWARE

CROSS-REFERENCE TO RELATED APPLICATIONS

Benefit Claim

This application is related to the following applications: (1) application Ser. No. 12/688,710, entitled "Special Values In Oracle Clusterware Resource Profiles," filed on Jan. 15, 2010, the entire contents of which is hereby incorporated by reference as if fully set forth herein; (2) application Ser. No. 12/688,715, entitled "'Local Resource' Type As A Way To Automate Management Of Infrastructure Resources In Oracle Clusterware," filed on Jan. 15, 2010, the entire contents of which is hereby incorporated by reference as if fully set forth herein; (3) application Ser. No. 12/688,723, entitled "Unidirectional Resource and Type Dependencies In Oracle Clusterware," filed on Jan. 15, 2010, the entire contents of which is hereby incorporated by reference as if fully set forth herein; (4) application Ser. No. 12/688,800, entitled "Conditional Dependency in a Computing Cluster", filed on Jan. 15, 2010, the entire contents of which is hereby incorporated by reference as if fully set forth herein; (5) application Ser. No. 12/688,739, entitled "Dependency On A Resource Type", filed on Jan. 15, 2010, the entire contents of which is hereby incorporated by reference as if fully set forth herein; (6) application Ser. No. 12/688,735, entitled "Self-Testable HA Framework Library Infrastructure", filed on Jan. 15, 2010, the entire contents of which is hereby incorporated by reference as if fully set forth herein. The applicants hereby rescind any disclaimer of claim scope in the related applications.

FIELD OF THE INVENTION

The present invention relates to clusterware systems. More specifically, the invention relates to dispersion dependencies in clusterware systems.

BACKGROUND

Clusterware

Clusterware is a general term that refers to a software product that is used to combine a set of nodes into a single entity, all members working together as a logical unit. A node may be a computer interconnected to other computers, or a server blade interconnected to other server blades in a grid. The single entity is referred to as a cluster or computer cluster. Clusterware allows this cluster to be controlled as a unit. For example, five nodes may be combined into a cluster, each node with its own combination of applications that may be supported by the cluster as a whole. An example of an application that may be installed on some or each of the nodes is a database management system (DBMS) such as those produced by Oracle Corporation, 500 Oracle Parkway, Redwood Shores Calif. Applications may be clusterware-aware (sometimes referred to as clusterware-enabled) and controllable by clusterware. These applications are designed to be deployed and managed using clusterware. Other applications may also be controlled by clusterware.

Clusterware may be implemented as middleware, residing between the operating system and any applications. Clusterware may also be implemented as part of the operating system. A cluster manager, or a node with management authority, manages the resources and services of a cluster. The policy engine, a component of the cluster manager, is responsible for managing services on the cluster according to policy specifications.

Clusterware Services

Services such as membership services are provided by the clusterware. Membership determines which computers or nodes are parts of the cluster, and which other servers can be substituted for the failed server in the cluster.

Resource management is another service provided by clusterware. Resource management techniques may vary with each clusterware product. In some implementations, clusterware considers everything it manages to be a resource, and what clusterware knows about each resource is defined in a resource profile for that resource. A resource may be anything that the clusterware manages, and may include any physical or logical entity that an application is comprised of, or uses to be able to provide services. Anything a resource depends upon may also be considered a resource. Physical entities may include hardware resources such as network cards, CPU, and memory. Logical entities may include resources such as IP addresses, applications, and processes such as daemons. Resources may depend on other resources, creating a hierarchy of resources. For example, a web server application is a resource that depends on an IP address, which is another resource.

To manage a resource means to direct resources and perform activities related to that resource. These activities may, for example, cause the resource to behave or be provisioned in a particular manner. Resource management includes placement and defining operability of resources within the cluster, including bringing resources online and taking them offline, as well as monitoring each resource. For example, putting an Internet Protocol (IP) address in the proper configuration location for a web server is a way of managing an IP address, while restarting the web server is a way of managing the web server. By managing the resources, the cluster manager is able to ensure the availability of resources in an environment requiring high availability of services. This is sometimes referred to as HA (high availability) resource management.

In some implementations, the resource profile controls what the clusterware will do when managing the resource. A resource profile is a collection of attributes having values that define the properties of the resource associated with the value. The attributes and properties may be made up of common or generic attributes and properties, or may be application specific. For example, if the resource crashes, the resource profile defines whether or not the particular resource, given the particular circumstance, will be restarted. As another example, if the resource keeps crashing, it may be relocated to another node in the cluster based on the configuration in the resource profile. Resource profiles may be grouped together to make up a logical group of profiles. This logical group of resource profiles is sometimes referred to as an HA (high availability) policy.

Clusterware Agents

Clusterware may use clusterware agents to assist in resource management activities. An agent is software comprising components of software modules that are invocable by other software modules that perform various actions on the applications or resources that manage the agent. Although a computing device actually performs agent functions pursuant to the instructions of the software modules, it is more convenient to describe the software modules as performing the functionality. There is no need to obfuscate embodiments of the invention by defining the role of a computing device with respect to each particular function being performed, as the software modules themselves adequately define this role.

Agents may have application or client-side components that are specific to the application and clusterware or server-side components that support the generic clusterware interface, with an Application Programming Interface (API) connecting the two sides. Agents, acting as an intermediary, receive messages from the clusterware, and handle the messages based on the application-side components, or application-specific code. Additionally, the application-side components may receive information from the application such as resource state information that describes the state of the resource. This application-specific code determines, at the agent, what a particular clusterware message means for the particular application. For example, an application may need to save data in order to shut down gracefully. Therefore, a "stop" command generated by the clusterware may result in the agent asking the application to save data, followed by a command that causes the application to cease processing.

Resource Dependencies

Clusterware may also be used to manage resource relationships, such as resource dependencies. Described herein are approaches for creating new kinds of dependencies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In one embodiment, resource profiles are stored. The resource profiles are for resources within a cluster of nodes. Each resource profile includes attributes for a resource. One or more of the attributes in one of the resource profiles includes a dispersion dependency attribute that specifies that the resource is preferably not co-located with another resource. Resources are placed within the cluster based, at least in part, on the dispersion preference.

In another embodiment, a first resource profile includes an attribute specifying a dispersion dependency between a first resource and a second resource. The first and second resources are placed on the same node of the cluster.

In another embodiment, the first and second resources are placed on different nodes of the cluster.

In another embodiment, the resources are placed based at least in part on a dispersion metric that indicates a measurement of preference for a resource not being co-located with another resource.

In another embodiment, the dispersion dependency attribute specifies that the resource is preferably not co-located with another one or more resources of a particular resource type.

Structural and Functional Overview

Figure 1:
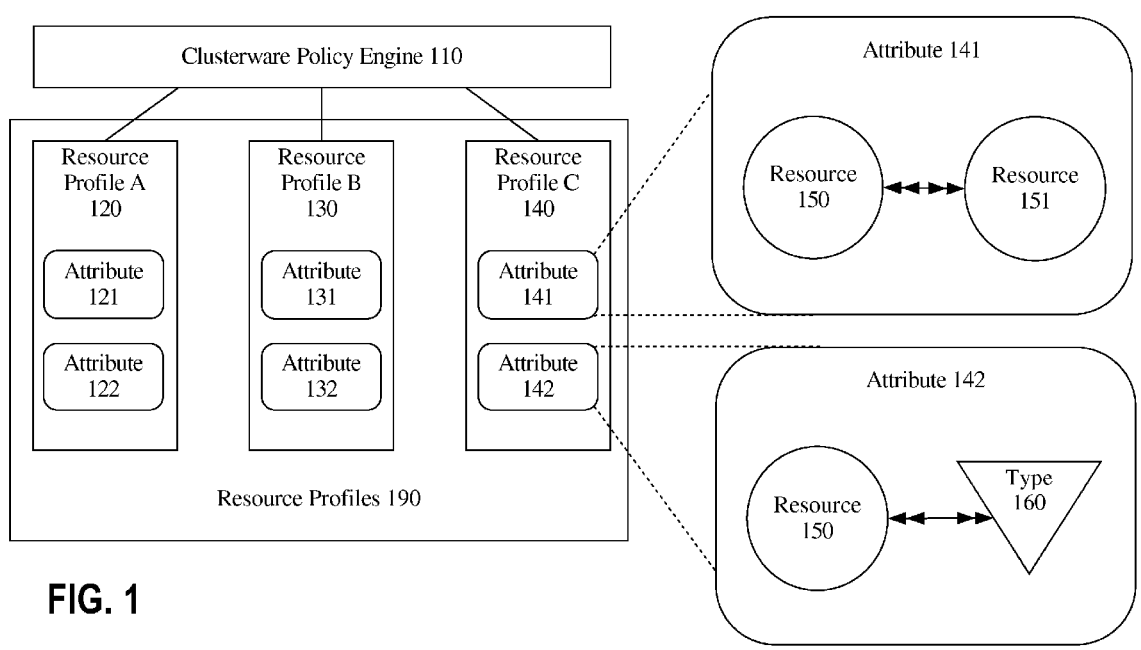
FIG. 1 is a block diagram illustrating an architecture on which an embodiment may be implemented.

FIG. 1 is a block diagram illustrating an architecture on which an embodiment may be implemented. A clusterware policy engine 110 is shown. Resource profiles 190 (for example, resource profile A 120, resource profile B 130, and resource profile C 140) are accessible to clusterware policy engine 110. Each resource profile comprises attributes. For example, resource profile A 120 comprises attribute 121 and attribute 122. Resource profile B 130 comprises attribute 131 and attribute 132. Resource profile C 140 comprises attribute 141 and attribute 142. Resource profiles may comprise any number of attributes, and there need not be consistency between the number of attributes for resources. An attribute such as attribute 141 or 142 may define a dependency between a resource and another resource or resource type. Clusterware policy engine manages resources based on dependencies and other attributes. Specifically, clusterware policy engine may manage resources based on dependencies that specify that a resource such as resource 150 depends on a resource type, such as type 160 as shown in attribute 142, or that a resource 150 depends on another resource 151, as shown in attribute 141.

Clusterware Modeling

Clusterware modeling, or resource modeling, is a term that describes the ability to express functional requirements of clusterware applications. Requirements are expressed in terms of resources that represent the components of the application, as well as any dependencies and any relationships between resources and components. The ability to model resources in clusterware is an important aspect of a clusterware system, because resource modeling allows policy-based management to be performed by configuration, instead of implementation using custom code that requires maintenance with each release of the clusterware product.

The bulk of modeling is expressed in resource profiles. For example, a particular resource may depend on another resource in order to function properly. Other attributes, such as attributes 121, 122, 131, 132, 141, and 142, may also be expressed in a resource profile. For example, the cardinality of a resource, or the number of nodes on which a resource may be provisioned, may be expressed in a resource profile for the resource. Expressing these attributes in a resource profile and making the resource profile available to the clusterware policy engine 110 is known as "registering" the resource.

Different kinds of dependencies may be expressed in a resource profile for a resource. A dependency is any relationship between a resource and another resource or resource type. For example, a dependency in a resource profile for a particular HTTP server resource may indicate that the HTTP server depends on a particular IP (Internet Protocol) address resource, such as 10.1.1.90. This dependency may have attributes or properties of its own that further describe the nature of the dependency. For example, the dependency may be a hard dependency or a soft dependency.

Hard dependencies are a way of indicating that, if A has a hard dependency on B, A must be stopped when B's state is offline, unknown, or otherwise not in the online state. A hard dependency may also mean that actions performed with respect to B must also be performed with respect to A. For example, if B is relocated to another node, A must also be relocated to another node. Other dependency attributes may be used to indicate, in the model, that one resource must start or stop before another resource may become active.

The following is an example of a dependency attribute in a resource profile that specifies that the resource for which the resource profile is modeling, is dependent on a resource called "resourceB":

START_DEPENDENCIES=hard (resourceB)

The dependency is a start dependency, and a hard dependency. More than one dependency may be defined in a single resource profile. For example, the following line may be found in a single resource profile:

START_DEPENDENCIES=hard(resourceB, resourceA, resourceC)

No particular syntax for expressing dependencies or other attributes is required. For example, resource profile attributes may be expressed in XML in an embodiment. In another embodiment, dependencies may be expressed individually, as follows:

```
START_DEPENDENCIES=hard(resourceB)
START_DEPENDENCIES=soft(resourceA)
START_DEPENDENCIES=hard(resourceD)
STOP_DEPENDENCIES=intermediate(resourceC)
```

Dispersion

Dispersion is a property between resources in a clusterware system that indicates that the resources should avoid co-location. This property is referred to as a "dispersion relation." The dispersion relation may be asymmetric or symmetric. In asymmetric dispersion, a first resource may be configured to avoid a second resource, even though the second resource is not configured to avoid the first resource. In symmetric dispersion, all resources in the dispersion relation are configured to avoid one another. For convenience, this application discusses dispersion relations in the context of asymmetric dispersion.

In an embodiment, dispersion relations are expressed by configuration in a resource profile associated with a clusterware resource. Specifically, a dispersion relation may be expressed as a dispersion dependency attribute in the resource profile of the resource that is configured to avoid co-location with another resource. For example, a particular web server resource, HTTPD1, may be configured to avoid a particular report generator resource, REPGEN1. This configuration may be included in the resource profile of the HTTPD1 resource, but may not be included in the resource profile of the REPGEN1 resource, thus creating an asymmetric dispersion relation. The configuration may be in the form of a start dependency attribute in the HTTPD1 resource profile, as shown below:

START_DEPENDENCIES=dispersion(REPGEN1)

Many reasons may exist for configuring one resource to avoid co-location with another. For example, the report generator may be known to require large amount of node resources such as memory and processor time. If reports are being generated, users requesting websites from the web server may experience slow delivery of those websites. Dispersion of resources may also benefit services requiring high availability. Dispersing resources that provide some identical function across nodes ensures that the service is still available in the case of a node failure. For example, if two HTTP servers that provide services to HTTP clients are running on different nodes, a node failure will only affect one of the servers. As another example, 3 independent IP-Listener resources may, in an embodiment, be actively dispersed so that there is at least one pair active and providing the service, while others are being recovered from a node failure.

Figure 2:
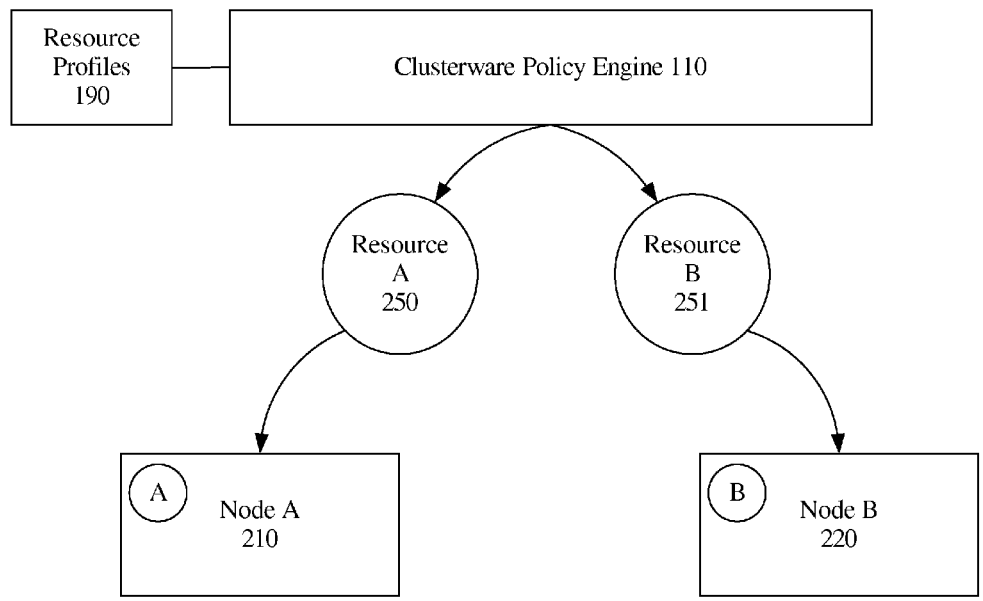
FIG. 2 is a block diagram illustrating dispersion in an embodiment.

FIG. 2 is a block diagram illustrating dispersion in an embodiment. Clusterware policy engine 110, a component of the clusterware manager, is communicatively coupled to resource profiles 190. In this example, resource A 250 and resource B 251 have a dispersion relation. For example, resource A 250 may be associated with a resource profile that is stored in resource profiles 190. The following line may appear in the resource profile for resource A 250:

START_DEPENDENCIES=dispersion(resource B)

This line indicates that, upon starting resource A, a dispersion dependency on resource B must be satisfied.

FIG. 2 shows resource A 250 being placed on node A 210, while resource B 251 is being placed on node B. Placing resource A 250 and resource B 251 on different nodes satisfies the dispersion dependency, since the dispersion dependency states that resource A 250 is preferably not co-located with resource B.

As another example, resource B 251 may be associated with a resource profile that is stored in resource profiles 190. The following line may appear in the resource profile for resource B 251:

START_DEPENDENCIES=dispersion(resource A)

This line indicates that, upon starting resource B, a dispersion dependency on resource A must be satisfied.

The placement of resource A 250 and resource B 251 on different nodes, as shown in FIG. 2, also satisfies this dispersion dependency in the profile associated with resource B 251. Although there is no requirement that each resource include, in its resource profile, a mirror image of a dispersion dependency included in the profile of the other, such configuration may be desirable. For example, each of the dependencies discussed above may be configured at the same time:

For resource A 250: START_DEPENDENCIES=dispersion(resource B)
For resource B 251: START_DEPENDENCIES=dispersion(resource A)

Although a dispersion dependency indicates a preference that the resource associated with the resource profile in which the dependency was configured not be co-located with another resource, dispersion does not indicate that a first resource cannot be co-located with a second resource. A dispersion dependency is not an absolute, but a preference.

Figure 3:
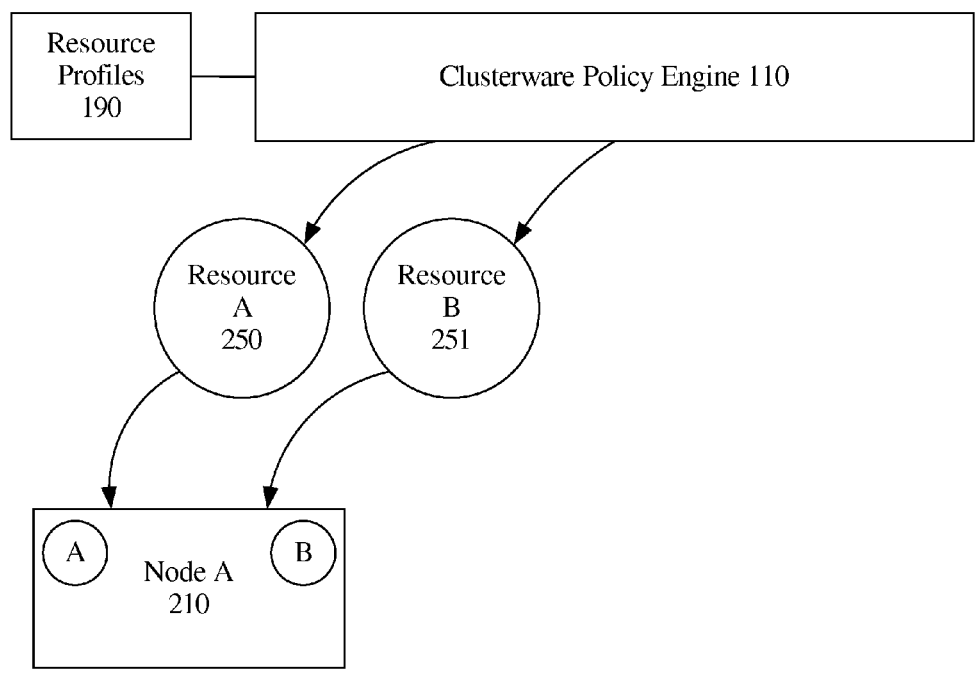
FIG. 3 is a block diagram illustrating an embodiment where resources having a dispersion relationship are co-located.

FIG. 3 is a block diagram illustrating an embodiment where resources having a dispersion relationship are co-located. The following dispersion dependencies may be configured in the resource profiles for resource A 250 and resource B 251:

For resource A 250: START_DEPENDENCIES=dispersion(resource B)
For resource B 251: START_DEPENDENCIES=dispersion(resource A)

However, it is possible that, despite the dispersion dependencies, the clusterware manager may determine that resource A 250 and resource B 251 should be co-located on the same node, such as node A 210.

Resource Types

In an embodiment, resources may be assigned resource types, also referred to herein as "types". A resource type is an attribute of a resource. Resources are unique, but some resources are instances of the same kind of resource. For example, 10.1.2.3 and 10.2.3.4 may be classified as "IP addresses." As another example, Oracle DBMS and MySQL may be classified as "Database Management Systems."

A type is an attribute that may be ascribed to resources, and must be formally defined. There is no requirement that the type ascribed to a resource make logical sense. For example, while it may be convenient to associate resources such as network interface cards with a type defined as "NIC" or "Network_Card," the network interface cards may be just as easily associated with a type defined as "Foo_Bar."

A type may be registered with the clusterware by creating a type definition. A type definition may be stored in any location format that the clusterware is capable of reading. The means of storage and storage format of type definitions may vary with each clusterware implementation. In one embodiment, type definitions are stored as a text file, and a reference to the text file is added to a clusterware configuration file. In another embodiment, type definitions are stored in XML format. The following represents only one example of a type definition:

```
NAME: T_ORACLE_DBMS
ATTRIBUTES:
    description: Oracle database management system
    query language: SQL
    version: string
```

Any number of attributes may be defined for a resource type. In addition, default values may be defined for attributes of a resource type.

In order for a resource to be of a particular type, that resource must be registered as a resource of the particular type. For example, an Oracle DBMS application may have the following line in its associated resource profile:

Type: T_ORACLE_DBMS

Upon registration of the resource, the clusterware policy engine will consider the resource type T_ORACLE_DBMS when managing the resource.

In an embodiment, types may be used in dependencies. For example, a particular resource may be dependent on a particular type. Such a dependency is distinct from a dependency of a resource on another resource.

In an embodiment, every resource is associated with a type. In another embodiment, resources may be associated with a type when such an association is deemed useful. Alternatively, resources that are not associated with a type implicitly inherit a generic type.

Dispersion Dependency Based on Resource Types

A dispersion dependency may be based on a type rather than a resource. A first resource may not only be configured with a preference for avoiding co-location with a second resource, but that resource may also be configured with a preference for not being co-located with any resource of a particular type.

For example, it may be desirable for the previously mentioned HTTPD1 resource, which may be of a type T_WEB-SERVER, to avoid co-location with other resources of the same type. The dispersion relation may be desirable for convenience, resource conservation, or any other conceivable reason. The resource profile associated with the HTTPD1 resource may include, instead of dispersion dependency that identifies a particular resource to avoid, a dispersion dependency that identifies a resource type to avoid. Such a configuration may be included in the resource profile for the HTTPD1 resource as follows:

START_DEPENDENCIES=dispersion(type:T_WEB-SERVER)

This indicates that before the HTTPD1 resource starts, its dispersion relation to other resources of the type T_WEB-SERVER must be considered.

FIG. 1 shows that a dispersion attribute, such as attribute 141, that defines a resource based dispersion dependency, may exist in the same resource profile as a dispersion attribute, such as attribute 142, which defines a type-based dispersion dependency. Attribute 142 is part of resource profile C 140, and refers to resource 150. Resource 150 has a dispersion dependency on type 160. The clusterware manager, when attempting to satisfy the dispersion dependency of resource C140, will interpret attribute 142 as a dispersion dependency of resource 150 on each resource having type 160.

Active Dispersion

Active dispersion is a term used to describe a dispersion relation that is continually evaluated. Examples provided above have assumed that dispersion dependencies are evaluated only when the resource is started. However, other embodiments include additional classes of dependencies, including "active" dependencies. Active dispersion dependencies are continually evaluated. In one embodiment, a resource which has an active dispersion dependency on another resource or type should be moved if possible to avoid the resource or type for which a dispersion has been configured, even if moving the particular resource requires that the resource be shut down before reprovisioning.

For example, a first and second resource such as HTTPD1 and HTTPD2 may be configured with active dispersion dependencies on each other, as shown in their respective resource profiles:

```
For resource HTTPD1:
START_DEPENDENCIES=active:dispersion(HTTPD2)
For resource HTTPD2: START_DEPENDENCIES=dispersion(HTTPD1)
```

The difference between the configuration for HTTPD1 and HTTPD2 is that the resource profile for HTTPD1 specifies an "active" dispersion dependency. In an embodiment, since the resource profile for HTTPD1 specifies an active dispersion and the resource profile for HTTPD2 does not specify an active dispersion dependency, HTTPD1 will be reprovisioned, even if running, to satisfy the active dispersion dependency; HTTPD2 will not.

Active dispersion may also be implemented using types. For example, the resource profile for HTTPD1 may include the following line:
     START_DEPENDENCIES=active:dispersion(type: T_WEBSERVER)
This line indicates that the HTTPD1 resource may be moved to avoid co-location of the HTTPD1 resource with any resource of the T_WEBSERVER type.

Figure 4:
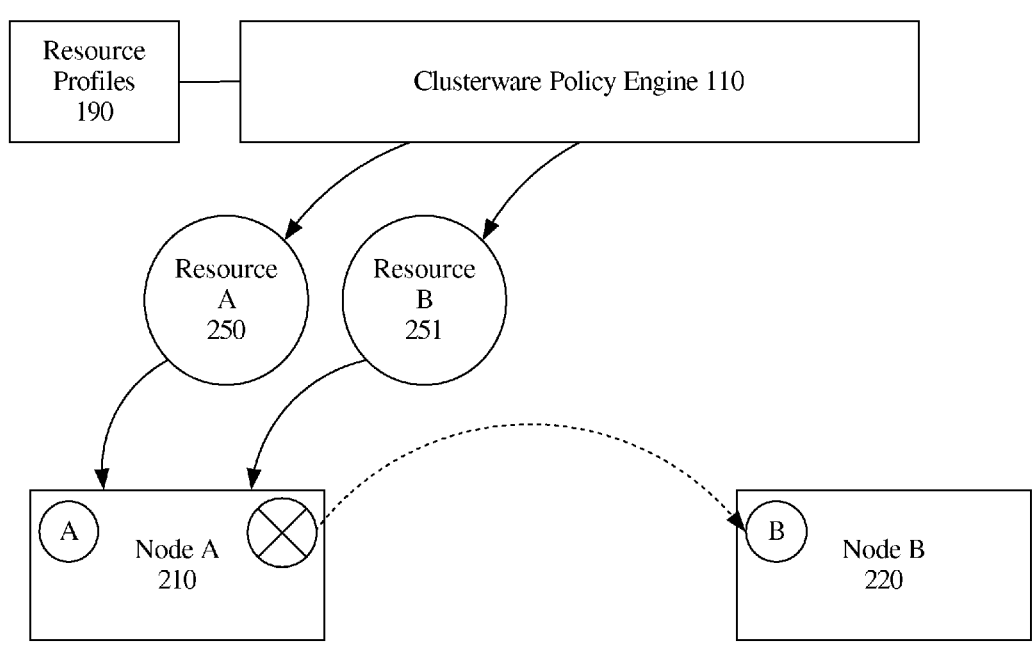
FIG. 4 is a block diagram illustrating active dispersion in an embodiment.

FIG. 4 is a block diagram illustrating active dispersion in an embodiment. Clusterware policy engine 110, part of the clusterware manager, is communicatively coupled to resource profiles 190. In this example, resource A 250 and resource B 251 have a dispersion relation, but are both placed on node A 210, despite the relation. Specifically, the resource profile associated with resource B 251 includes an active dispersion dependency on resource A, as follows:
     START_DEPENDENCIES=active:dispersion(Resource A)
Although resource A 250 and resource B 251 have been placed on the same node (node A 210), the clusterware policy engine 110 actively monitors the cluster to determine whether the dispersion dependency can be better satisfied by moving resource B 251 to another node. When node B 220 is added to the cluster, the clusterware policy engine determines that reprovisioning resource B 251 will better satisfy the dependency. The clusterware policy manager reprovisions resource B 251 to node B 220. Reprovisioning may include saving the state of resource B 251 in memory or on a computer-readable medium, stopping resource B 251, installing resource B 251, and starting resource B, or any combination of these steps, including additional steps required for causing resource B 251 to be placed on node B 220 instead of node A 210.

Figure 5:
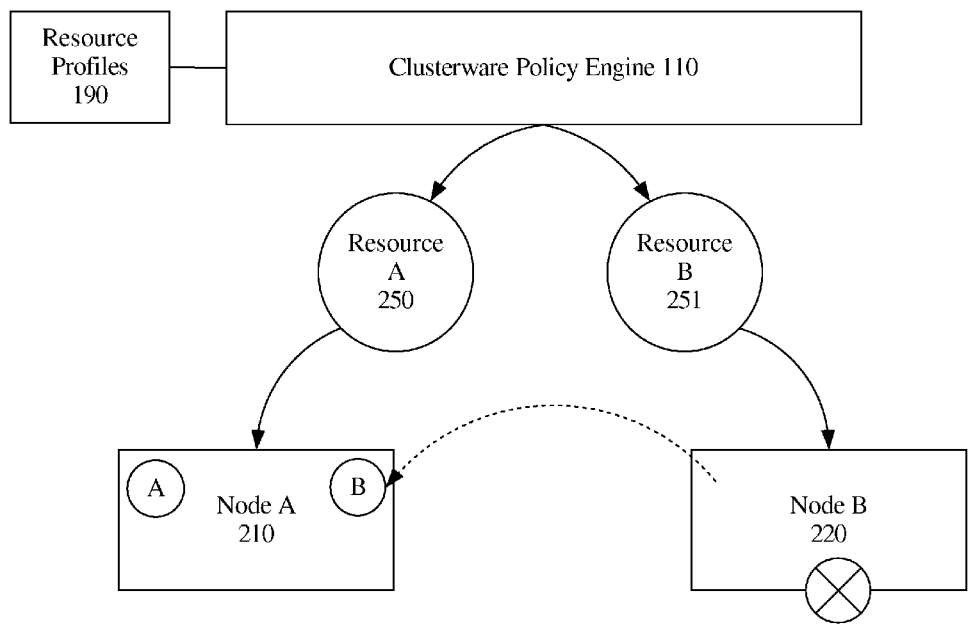
FIG. 5 is a block diagram illustrating an embodiment where resources having a dispersion relationship are co-located.

FIG. 5 is a block diagram illustrating an embodiment where resources having a dispersion relationship are co-located. In an embodiment, resource A 250 and resource B 251 are placed on separate nodes 210 and 220. When node B 220 experiences a cluster event, such as unavailability of local resources, resource B 251 is moved to node A 210. In an embodiment, movement of resources based on cluster events may only occur when active dispersion is specified. In another embodiment, movement of resources based on cluster events may occur even if no dispersion is specified, or if non-active dispersion is specified. For example, resources may be moved due to a server failure.

Dispersion Metrics

Dispersion metrics assist the clusterware manager in determining which, if any, resources should be co-located with one another. In an embodiment, one or more dispersion metrics may be used to determine placement or movement of resources within a cluster. Dispersion metrics may be used alone, or in combination with one another. Dispersion metrics may also be used in combination with other factors, including availability of system resources, when provisioning resources.

One dispersion metric may be based on the number of a particular type of resource on a node. For example, a first node may include three resources of type T_DBMS, while a second resource includes only one resource of type T_DBMS. If a particular resource has a dispersion dependency on type T_DBMS, both nodes fail to satisfy the dependency because each node includes at least one resource of the dispersed type. However, a dispersion metric may be based on the number of resources of the dispersed type, and used as a weighting mechanism for the clusterware policy engine 110 to use for determining a preferred placement for the particular resource. In this case, since the first node includes three resources of the dispersed type, the metric associated with the first node will be "3." Since the second node includes only one resource of the dispersed type, the metric associated with the second node will be "1." The clusterware policy engine 110 will interpret the lower number as the metric associated with the preferred node, and will place the particular resource on the second node.

In another embodiment, a dispersion metric may be associated with a dispersion dependency in a resource profile. For example, one dispersion dependency may be deemed more important than another.

Figure 6:
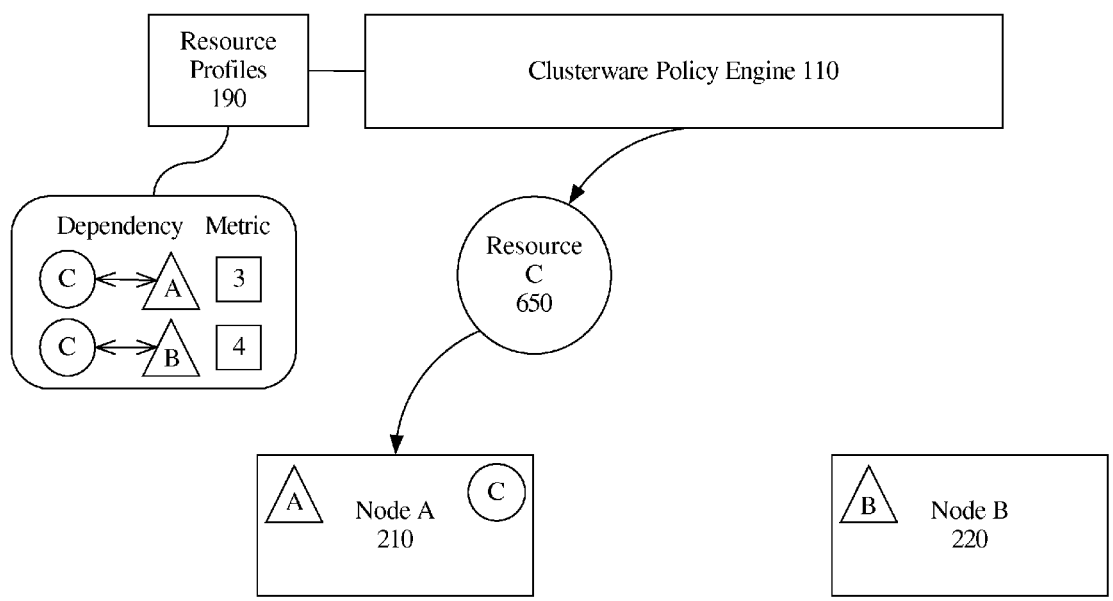
FIG. 6 is a block diagram illustrating dispersion metric implementation in an embodiment.

FIG. 6 is a block diagram illustrating dispersion metric implementation in an embodiment. A portion of a resource profile for resource C 650 may include the following lines:
START_DEPENDENCIES=active:dispersion(type:A[metric:3], type:B[metric:4])
The first line indicates that a dispersion metric of 3 will be associated with any resource of type "A." The second line indicates that a dispersion metric of 4 will be associated with any resource of type "B." This metric indicates the amount of aversion that resource C 650 has to the type.

In the embodiment shown in FIG. 6, node A 210 includes one resource of type A, and node B 220 includes one resource of type B. Since resource C 650 has a greater aversion to placement on the same node as a resource of type B, resource C 650 will be placed on node A 210.

In an embodiment, an aggregate dispersion metric will be considered. The aggregate dispersion metric is based on the dispersion metrics assigned to dispersion dependencies and the number of those resources running on the node. If additional dispersion dependencies have been defined in a resource profile, each dispersion metric for each resource will be included in the aggregate dispersion metric.

Figure 7:
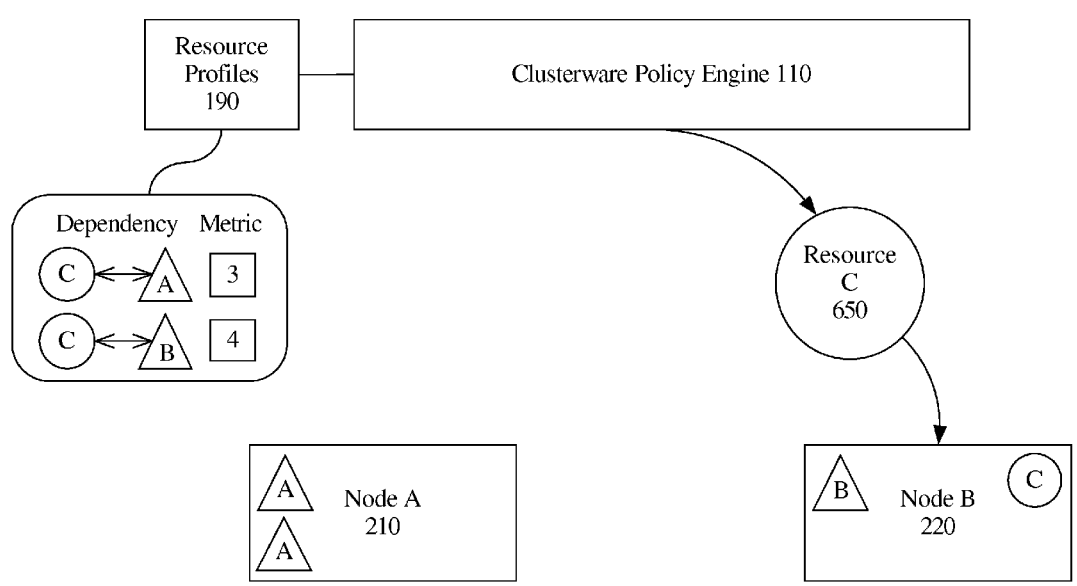
FIG. 7 is a block diagram illustrating aggregate dispersion metric implementation in an embodiment.

FIG. 7 is a block diagram illustrating aggregate dispersion metric implementation in an embodiment. As previously discussed with reference to FIG. 6, a portion of a resource profile for resource C 650 may include the following lines:
START_DEPENDENCIES=active:dispersion(type:A[metric:3], type:B[metric:4])
Thus, resource C 650 has a dispersion metric of 3 with respect to type A, and has a dispersion metric of 4 with respect to type B.

The difference between FIG. 6 and FIG. 7 is that node A 210 includes two resources of type A in FIG. 7. When the dispersion metric of 3 is counted for each resource of type A, the aggregate dispersion metric associated with node A 210 will be "6." However, the aggregate dispersion metric associated with Node B 220 will remain "4," because only one resource of type B is included on Node B 220. Since resource C 650 has a greater aversion to Node A 210, resource C 650 will be placed on node B 220.

To alter the scenario in FIG. 7, the metric assigned to each dependency may be changed. For example, the resource profile for resource C 650 may, instead, include the following lines:
START_DEPENDENCIES=active:dispersion(type:A[metric:2], type:B[metric:9])
This configuration would cause resource C650 to be placed on node A 210 instead of node B 220, since node A 210 would have an aggregate dispersion metric of 4, while node B 220 would have an aggregate dispersion metric of 9. In the example, it would take five resources of type A, instead of two, to shift the node preference to node B 220.

Implied Dispersion

Implied dispersion occurs when a dispersion attribute is inherited, by a resource, from a source other than a resource profile. For example, a type definition file for a first type may indicate that resources of that type should, by default, have a dispersion dependency on a second type. In an embodiment, any resource of the first type will have a dispersion dependency on a second type, even if no dispersion relation is included in the resource profile for the first resource.

In another embodiment, a dispersion attribute may be implied based on a dispersion dependency defined in the resource profile of another resource. For example, if the resource profile for resource A includes:
START_DEPENDENCIES=active:dispersion(Resource B)
then resource B, based on implied dispersion, will be treated as having a dispersion dependency on resource A. Even though a dispersion dependency has not been defined in the resource profile for resource B, the clusterware manager, in an embodiment, will treat resource B as though the resource profile for resource B includes the following line:
START_DEPENDENCIES=active:dispersion(Resource A)

Example Flow

Figure 8:
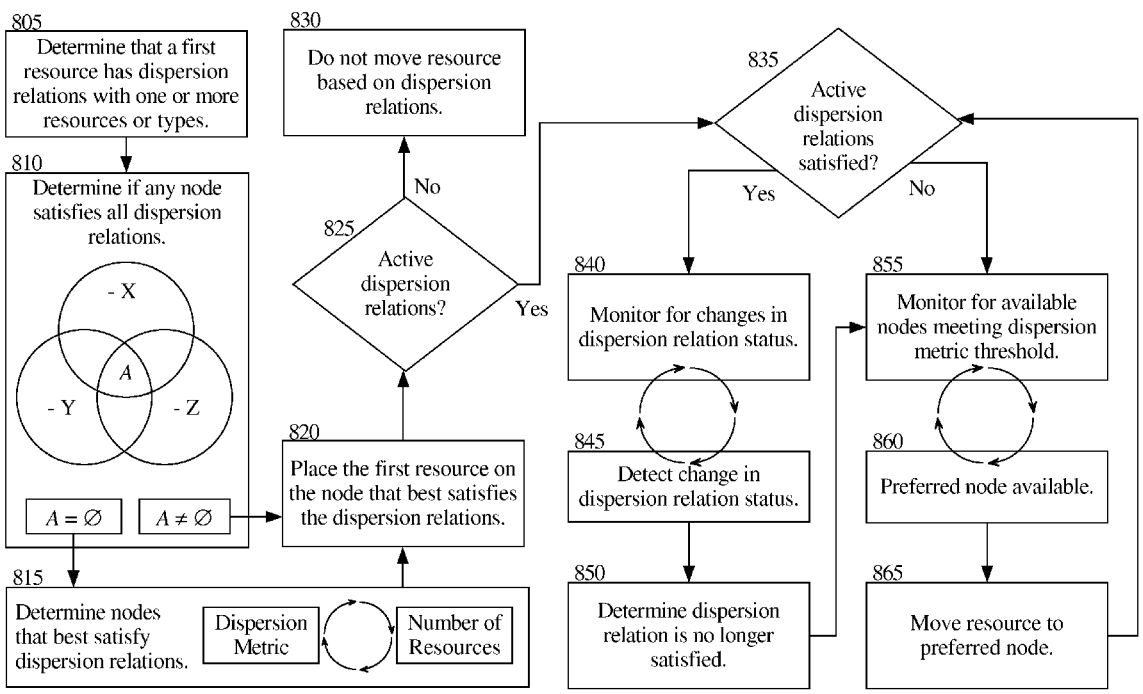
FIG. 8 is a flow diagram illustrating an embodiment.

FIG. 8 is a flow diagram illustrating an embodiment. At step 805, the clusterware manager determines that a first resource has dispersion relations with one or more resource types. For example, the resource profile for the first resource may have a dispersion dependency on a particular second resource, or on a particular resource type. At step 810, the clusterware manager determines whether or not a node in the cluster satisfies all dispersion relations. For example, the resource may have a dispersion dependency on X, Y, and Z, where X, Y, and Z are particular resources or resource types.

The Venn diagram in step 810 illustrates three sets of nodes in the cluster. The –X set includes no nodes with the resource or resource type X. The –Y set includes no nodes with the resource or resource type Y. The –Z set includes no nodes with the resource or resource type Z. A is a set that represents the intersection of sets –X, –Y, and –Z. If A is an empty set (i.e., all nodes in the cluster include at least one of X, Y, or Z), then the flow moves on to step 815. If A is not an empty set (i.e., there is a node in the cluster that does not include X, Y, or Z), then the flow moves to step 820.

At step 815, the clusterware manager determines which nodes best satisfy the dispersion relations. Any registered dispersion metrics are considered, along with the number of resources or types with which the first resource has a dispersion relation to. For example, the first resource may have a dispersion dependency on a first type with a dispersion metric of 2, and a second type with a dispersion metric of 5, indicating a strong preference for not being co-located with the second type. However, if four resources of the first type are placed on a first node, and only one resource of the second type is placed on a second node, the aggregate dispersion metric will be considered. The aggregate dispersion metric will take the product of the dispersion metric of (i.e., 2) and the number of that type of resource running on the node (i.e., 4) to produce an aggregate dispersion metric of 8. The second node will be the preferred node, since it has a smaller aggregate dispersion metric of 5. At step 820, the first resource is placed on the node that best satisfies all dispersion relations.

At step 825, the clusterware manager determines whether any of the dispersion dependencies for the first resource are "active." If no dispersion dependencies are active, at step 830, the first resource is not reprovisioned once it has been placed on a node unless the node becomes inactive.

At step 835, the clusterware manager determines whether all active dispersion relations are satisfied. If all active dispersion relations are satisfied, the flow moves to step 840, where the clusterware manager monitors the cluster for changes that affect the dispersion relation status. For example, a node may become unavailable, causing resources to be moved to a different node. The movement of resources may occur despite a contrary dispersion relation. At step 845, a change is detected in a dispersion relation status. At step 850, a determination is made that a dispersion relation is no longer satisfied.

When a determination is made that an active dispersion is not satisfied, the flow moves to step 855, where the clusterware manager monitors the cluster for available nodes that meet a dispersion metric threshold. For example, it may be desirable to move a resource from a first node to a second node to satisfy a dispersion relation only if the second node provides a significant advantage over the first node. Thus, even if a slight advantage would be gained, the clusterware manager may determine that the threshold dispersion metric difference between the nodes for moving a resource has not been met.

At step 860, a preferred node becomes available. At step 865, the resource is moved to the preferred node. At this time, the flow moves to step 835 again, to determine if all active dispersion relations are satisfied. In addition, if a new resource is registered with the cluster, a flow may begin at step 805 to determine the node on which the resource should be placed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
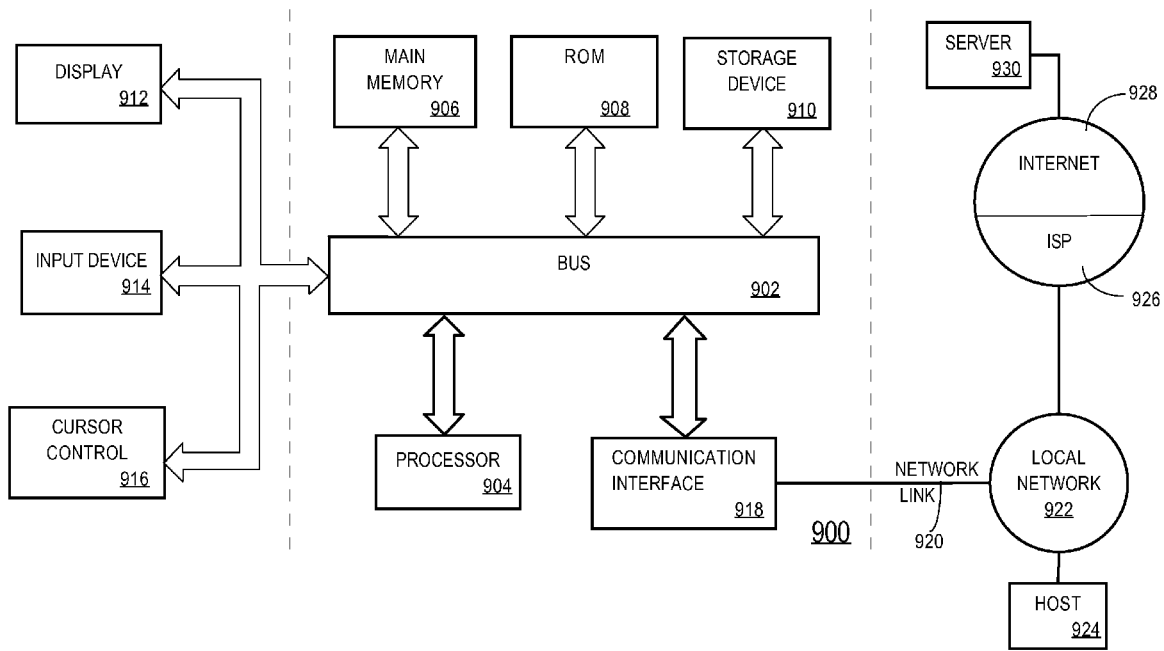
FIG. 9 illustrates a computer system upon which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
storing resource profiles for resources within a cluster comprising a plurality of nodes,
wherein each resource profile of said resource profiles includes one or more resource profile attributes for a respective resource,
wherein a resource profile of said resource profiles includes a dispersion dependency attribute that contains a dispersion relation specifying one or more specified resources, and
wherein said dispersion relation specifies a preference to not co-locate one or more resources corresponding to the resource profile with the one or more specified resources on a node of the cluster plurality of nodes; and
accessing, by a computing device configured to manage the cluster;
determining, by the computing device, to place one or more resources corresponding to the resource profile on one or more particular nodes of the plurality of nodes,
wherein said determining comprises:
determining whether the preference specified by said dispersion relation can be satisfied,
when said dispersion relation is not able to be satisfied, determining to place the one or more resources corresponding to the resource profile without regard to the dispersion relation, and
when said dispersion relation is able to be satisfied, determining to place the one or more resources corresponding to the resource profile based on the dispersion relation; and
causing, by the computing device, the one or more resources to be provisioned on the one or more particular nodes of the cluster;
wherein the method is performed by one or more computing devices.

2. The method of claim 1:
wherein the resource profile corresponds to a first resource;
wherein the dispersion relation specifies a second resource; and
wherein when said dispersion relation is not able to be satisfied, said determining to place the one or more resources corresponding to the resource profile without regard to the dispersion relation comprises determining to place said first resource on a particular node that the second resource is placed after attempting to satisfy the preference indicated by said dispersion relation.

3. The method of claim 1:
wherein the resource profile corresponds to a first resource;
wherein the dispersion relation specifies a second resource; and
wherein when said dispersion relation is able to be satisfied, said determining to place the one or more resources corresponding to the resource profile based on the dispersion relation comprises determining to place said first resource on a first node of said cluster, wherein the second resource is not placed on the first node of said cluster.

4. The method of claim 1,
wherein the dispersion relation includes a dispersion metric value; and
wherein said determining is based at least in part on the dispersion metric value.

5. The method of claim 4,
wherein said determining is based on comparing a dispersion metric with the dispersion metric value, wherein the dispersion metric is based on a number of resources of a particular type of resource on a particular node or a particular cluster.

6. The method of claim 1,
wherein the resource profile corresponds to a first resource;
wherein the dispersion relation specifies a second resource;
wherein the dispersion relation is an active dispersion relation that is evaluated one or more additional times after the first resource is started;
wherein said determining comprises determining to place the first resource on a particular node that the second resource is placed on;
further comprising reprovisioning the first resource or the second resource on a second node based at least in part on the dispersion relation.

7. The method of claim 6, wherein said reprovisioning is performed based at least in part on a cluster event.

8. The method of claim 1,
wherein the resource profile corresponds to a first resource;
wherein the dispersion relation specifies a second resource;
wherein said determining comprises determining to place the first resource on a first node of said cluster and determining to place the second resource on a second node of said cluster;
the method further comprising reprovisioning the first resource and the second resource on the same node based at least in part on a cluster event.

9. The method of claim 1, wherein the dispersion relation further specifies a degree of aversion or avoidance between the one or more resources corresponding to the resource profile and the one or more specified resources being located together on one of said nodes of the cluster.

10. The method of claim 9, wherein the resource profile corresponds to resources of a first resource type and the one or more specified resources are resources of the first resource type.

11. The method of claim 1,
wherein the resource profile corresponds to a first resource;
wherein the dispersion relation specifies a second resource;
wherein a second resource profile for the second resource does not include a resource profile attribute that explicitly contains a dispersion relation between the second resource and the first resource;
the method further comprising associating, with the second resource, an implied dispersion relation based on the dispersion relation in the resource profile,
wherein the implied dispersion relation indicates a preference to not co-locate the second resource with the first resource.

12. A non-transitory computer-readable storage medium storing one or more sequences of instructions which, when executed, cause one or more processors to perform:
storing resource profiles for resources within a cluster comprising a plurality of nodes,
wherein each resource profile of said resource profiles includes one or more resource profile attributes for a respective resource, wherein a resource profile of said resource profiles includes a dispersion dependency attribute that contains a dispersion relation specifying one or more specified resources, and wherein said dispersion relation specifies a preference to not co-locate one or more resources corresponding to the resource profile with the one or more specified resources on a node of the cluster plurality of nodes; and accessing, by a computing device configured to manage the cluster;

determining, by the computing device, to place one or more resources corresponding to the resource profile on one or more particular nodes of the plurality of nodes, wherein said determining comprises:

determining whether the preference specified by said dispersion relation can be satisfied, when said dispersion relation is not able to be satisfied, determining to place the one or more resources corresponding to the resource profile without regard to the dispersion relation, and when said dispersion relation is able to be satisfied, determining to place the one or more resources corresponding to the resource profile based on the dispersion relation; and causing, by the computing device, the one or more resources to be provisioned on the one or more particular nodes of the cluster.

13. The non-transitory computer-readable storage medium of claim 12:

wherein the resource profile corresponds to a first resource;
wherein the dispersion relation specifies a second resource; and
wherein when said dispersion relation is not able to be satisfied, said determining to place the one or more resources corresponding to the resource profile without regard to the dispersion relation comprises determining to place said first resource on a particular node that the second resource is placed on after attempting to satisfy the preference indicated by said dispersion relation.

14. The non-transitory computer-readable storage medium of claim 12, wherein:

wherein the resource profile corresponds to a first resource;
wherein the dispersion relation specifies a second resource; and
wherein when said dispersion relation is able to be satisfied, said determining to place the one or more resources corresponding to the resource profile based on the dispersion relation comprises determining to place said first resource on a first node of said cluster, wherein the second resource is not placed on the first node of said cluster.

15. The non-transitory computer-readable storage medium of claim 12, wherein said determining is based at least in part on a dispersion metric value.

16. The non-transitory computer-readable storage medium of claim 15, wherein said determining is based on comparing a dispersion metric with the dispersion metric value, wherein the dispersion metric is based on a number of resources of a particular type of resource on a particular node or a particular cluster.

17. The non-transitory computer-readable storage medium of claim 12, wherein the resource profile corresponds to a first resource;
wherein the dispersion relation specifies a second resource; and
wherein the dispersion relation is an active dispersion relation that is evaluated one or more times after the first resource is started;
wherein said determining comprises determining to place the first resource on a particular node that the second resource is placed on;
wherein the one or more sequences of instructions further include instructions which, when executed, further cause the one or more processors to perform reprovisioning the first resource or the second resource on a second node based at least in part on the dispersion relation.

18. The non-transitory computer-readable storage medium of claim 17, wherein said reprovisioning is performed based at least in part on a cluster event.

19. The non-transitory computer-readable storage medium of claim 12, wherein the resource profile corresponds to a first resource;
wherein the dispersion relation specifies a second resource;
wherein said determining comprises determining to place the first resource on a first node of said cluster and determining to place the second resource on a second node of said cluster;
wherein the one or more sequences of instructions further include instructions which, when executed, further cause the one or more processors to perform reprovisioning the first resource and the second resource on the same node based at least in part on a cluster event.

20. The non-transitory computer-readable storage medium of claim 12, wherein the dispersion relation further specifies a degree of aversion or avoidance the one or more resources corresponding to the resource profile and the one or more specified resources being located together on one of said nodes of the cluster.

21. The non-transitory computer-readable storage medium of claim 20, wherein the resource profile corresponds to resources of a first resource of a first resource type and the one or more specified resources are resources of first resource type.

22. The non-transitory computer-readable storage medium of claim 12, wherein the resource profile corresponds to a first resource;
wherein the dispersion relation specifies a second resource;
wherein a second resource profile for the second resource does not include a resource profile attribute that explicitly contains a dispersion relation between the second resource and the first resource;
wherein the one or more sequences of instructions further include instructions which, when executed, further cause the one or more processors to perform associating, with the second resource, an implied dispersion relation based on the dispersion relation in the resource profile,
wherein the implied dispersion relation indicates a preference to not co-locate the second resource with the first resource.

* * * * *